(12) United States Patent
Talbot

(10) Patent No.: US 10,110,731 B2
(45) Date of Patent: Oct. 23, 2018

(54) METHOD AND SYSTEM FOR RECORDING VIDEO RELAY SERVICE CALLS

(71) Applicant: Chris Talbot, Moorpark, CA (US)

(72) Inventor: Chris Talbot, Moorpark, CA (US)

( * ) Notice: Subject to any disclaimer, the term of this patent is extended or adjusted under 35 U.S.C. 154(b) by 0 days.

(21) Appl. No.: 15/240,818

(22) Filed: Aug. 18, 2016

(65) Prior Publication Data

US 2018/0034957 A1 Feb. 1, 2018

Related U.S. Application Data

(60) Provisional application No. 62/368,621, filed on Jul. 29, 2016.

(51) Int. Cl.
| | |
|---|---|
| *H04N 7/14* | (2006.01) |
| *H04M 3/22* | (2006.01) |
| *H04M 3/42* | (2006.01) |
| *H04L 29/06* | (2006.01) |
| *H04L 12/937* | (2013.01) |
| *H04N 5/93* | (2006.01) |
| *G06T 1/00* | (2006.01) |
| *H04N 7/15* | (2006.01) |
| *H04N 5/232* | (2006.01) |
| *H04N 5/369* | (2011.01) |

(52) U.S. Cl.
CPC ......... *H04M 3/2281* (2013.01); *G06T 1/0021* (2013.01); *H04L 49/253* (2013.01); *H04L 65/1006* (2013.01); *H04M 3/42059* (2013.01); *H04M 3/42102* (2013.01); *H04M 3/42391* (2013.01); *H04N 5/9305* (2013.01); *H04N 7/147* (2013.01); *H04N 7/15* (2013.01); *H04M 2201/50* (2013.01); *H04N 5/23293* (2013.01); *H04N 5/369* (2013.01)

(58) Field of Classification Search
USPC ........................................................ 379/260
See application file for complete search history.

(56) References Cited

U.S. PATENT DOCUMENTS

| | | | | |
|---|---|---|---|---|
| 5,978,014 | A * | 11/1999 | Martin ................ | H04L 12/1818 348/14.08 |
| 7,899,167 | B1 * | 3/2011 | Rae ........................ | H04M 3/38 379/189 |
| 2005/0094793 | A1 * | 5/2005 | D'Agosto, III ... | H04M 3/42221 379/202.01 |
| 2005/0123111 | A1 * | 6/2005 | Philbin ................ | H04M 15/08 379/114.2 |

(Continued)

*Primary Examiner* — Maria El-Zoobi
(74) *Attorney, Agent, or Firm* — Scheinberg & Associates, P.C.; John B. Kelly

(57) ABSTRACT

Embodiments of the present invention are directed to a method and system for recording video relay service (VRS) calls. The method comprises providing a VRS call recorder, a VRS rules gateway, and a VRS video client connected to each other by means of a computer network; initiating a VRS call using the VRS video client; sending the VRS call to the VRS rules gateway; determining, by the VRS rules gateway, whether the VRS call is to be recorded; in response to a determination that the VRS call is to be recorded: modifying a property of the VRS call to indicate that the call is to be recorded; detecting, by the VRS call recorder, the modified VRS call property; and in response to detecting the modified VRS call property, trying the VRS call with recording enabled.

24 Claims, 2 Drawing Sheets

(56) References Cited

U.S. PATENT DOCUMENTS

2012/0176466 A1* 7/2012 Wrench ............... G06Q 10/101
348/14.07
2015/0037770 A1* 2/2015 Philp ...................... G09B 5/04
434/247

* cited by examiner

METHOD AND SYSTEM FOR RECORDING VIDEO RELAY SERVICE CALLS

TECHNICAL FIELD OF THE INVENTION

The present invention relates to telecommunications services for callers who are deaf, hard-of-hearing, or speech impaired, and in particular to video relay service (VRS).

BACKGROUND OF THE INVENTION

Traditional telephony presents a problem for persons who are who are deaf, hard of hearing, or speech-impaired (D-HOH-SI). Communication by telephone requires each party to a telephone call to be able to hear and/or speak to the other party on the call to communicate. For hearing or speech impaired persons, audio communication is difficult or impossible, making telephone communication difficult or impossible.

Early approaches to facilitating telecommunications for D-HOH-SI persons included text-based telecommunications relay service (TRS). Text-based TRS services allow a D-HOH-SI person to communicate with other people over an existing telecommunications network using devices capable of transmitting and receiving text characters over the telecommunications network. Such devices include the telecommunications device for the deaf (TDD) and the teletypewriter (TTY). Text-based TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of video relay services (VRS) by D-HOH-SI persons. Using VRS equipment, D-HOH-SI persons can place video calls to communicate between themselves and with hearing individuals using sign language. VRS equipment enables D-HOH-SI persons to talk to Hearing individuals via a sign language interpreter, who uses a conventional telephone at the same time to communicate with the party or parties with whom the D-HOH-SI person wants to communicate. The interpretation flow is normally within the same principal language, such as American Sign Language (ASL) to spoken English or spoken Spanish.

Recording of VRS calls presents a unique set of issues, especially in a corrections environment (e.g., prison, juvenile detention center, etc.) where certain calls are required be to recorded and other calls are prohibited from being recorded (such as a confidential/privileged call to an attorney or clergy). For hearing individuals, prisons typically include an audio announcement at the beginning of a call announcing that the call is being recorded. The announcement gives notice to the parties on the call that the call is being recorded before any conversation takes place. A hearing impaired person may not be able to hear or understand the audio announcement. A static video watermark indicating that the call is being recorded is used with video calls.

The decision to record a VRS call from or to a prison inmate is typically made by a person such as a security administrator at the prison. The security administrator determines whether a call is to be recorded based on the identity of the inmate and the number that is being called or from which a call is received. The security administrator consults a registry or database having records that indicate the telephone numbers for which calls are not to be recorded. Because a human is making the decisions by looking up records in a table, this can be a time consuming process that is prone to error. Furthermore, recording a phone call that is not supposed to be recorded can subject the administrator and/or the institution to civil and/or criminal liability. Also, evidence accrued from an unlawfully recorded call may end up being excluded at trial as being "fruit of the poison tree". What is needed is an automated process that can reliably initiate recordings of VRS phone calls only when it is lawful to make such recordings, especially in a corrections environment with inmates who are hearing impaired.

SUMMARY OF THE INVENTION

Embodiments of the present invention are directed to a method for recording video relay service (VRS) calls. The method comprises providing a VRS call recorder; providing a VRS rules gateway connected to the VRS call recorder by means of a computer network; providing a VRS video client connected to the VRS call recorder and the VRS rules gateway by means of a computer network; initiating a VRS call using the VRS video client; sending the VRS call to the VRS rules gateway; determining, by the VRS rules gateway, whether the VRS call is to be recorded; in response to a determination that the VRS call is not to be recorded, trying the VRS call without recording the VRS call; in response to a determination that the VRS call is to be recorded: modifying a property of the VRS call to indicate that the call is to be recorded; detecting, by the VRS call recorder, the modified VRS call property; and in response to detecting the modified VRS call property, trying the VRS call with recording enabled.

Embodiments of the present invention are directed to a system for recording video relay service (VRS) calls. The system comprises a VRS call recorder; a VRS rules gateway connected to the VRS call recorder by means of a computer network; a VRS video client connected to the VRS call recorder and the VRS rules gateway by means of a computer network; in which the system is configured for: the VRS video client initiating a VRS call; the VRS video client sending the VRS call to the VRS rules gateway; the VRS rules gateway determining whether the VRS call is to be recorded; in response to a determination that the VRS call is not to be recorded, the VRS rules gateway trying the VRS call without recording the VRS call; in response to a determination that the VRS call is to be recorded: the VRS rules gateway sending an instruction to the VRS video client, the instruction modifying a property of the VRS call to indicate that the call is to be recorded; the VRS video client modifying the property of the VRS call to indicate that the call is to be recorded and re-initiating the VRS call; the VRS call recorder detecting the modified VRS call property; and in response to detecting the modified VRS call property, the VRS rules gateway trying the VRS call with recording enabled.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention are directed to a method and system for automatically recording video relay service (VRS) calls based on dynamically applied call properties. The VRS video recorder can be dynamically engaged based on a combination of call source and call destination. Video watermarks can also be dynamically applied based on call properties. Embodiments of the present invention provide configurable watermarking that is dynamic if the prison security administrator indicates that recorded calls should have watermarks. In some embodiments of the present invention, the recorder is a stand-alone device and does not have to be part of the VRS phone system.

Figure 1:
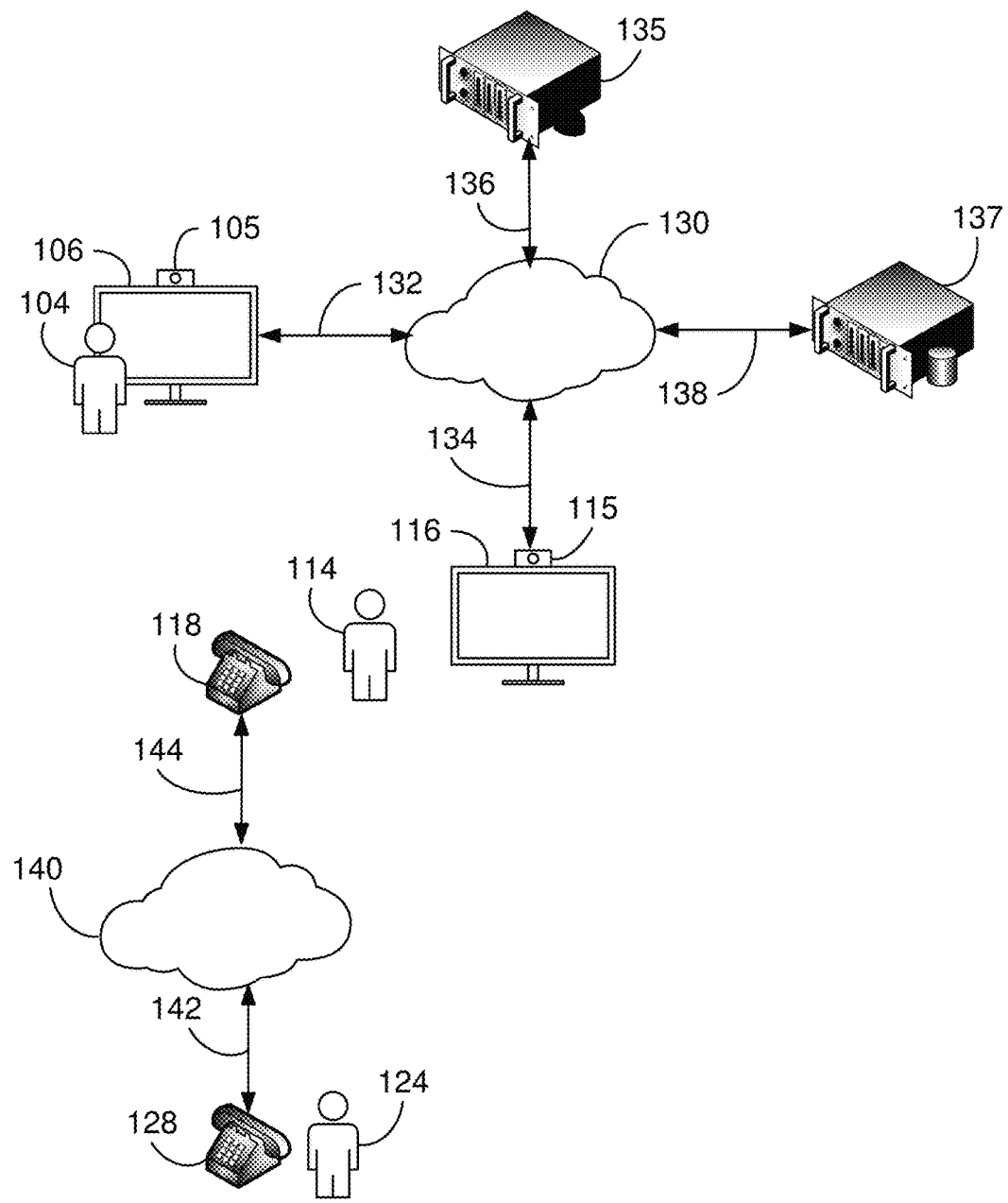
FIG. 1 is a schematic diagram showing a video relay service (VRS) system with automated call recording in accordance with embodiments of the present invention.

FIG. 1 is a schematic diagram showing a video relay service (VRS) system with automated call recording in accordance with embodiments of the present invention. User 104 is located in proximity to VRS client 105 so that user 104 can interact with VRS client 105. User 104 is preferably a person who is deaf (D), hard-of-hearing (HOH), speech-impaired (SI), or any other person who communicates via sign language. User 104 can be an inmate in a corrections environment (e.g., prison, juvenile detention center, etc.). User 104 interacts with VRS client 105 by viewing video on display 106. Display 106 is any device suitable for displaying to user 104 a video signal of a sign language interpreter, such as sign language interpreter 114, in sufficient quality so that a person fluent in sign language can comprehend the sign language interpreter. VRS client 105 includes a video capture device suitable for capturing a video signal of user 104 within the field-of-view of the camera at sufficient quality and frame rate to support sign language communication with sign language interpreter 114. VRS client 105 also includes hardware and/or software to, substantially in real-time, convert the captured video signal into a data stream suitable for transmission over packet-switched network 130, such as an internet protocol (IP) network, over network link 132. VRS client 106 also includes hardware and/or software to transmit the data stream over packet-switched network 130 at sufficient network speed so that a remote VRS client, such as VRS client 115, can display the data stream as video on a display device, such as display 116, in sufficient quality for sign language interpreter 114 to comprehend sign language in the displayed video. VRS client 105 can also include hardware and/or software to, substantially in real-time, receive a data stream from a remote VRS terminal, such as VRS terminal 115, from packet-switched network 130 over network link 132, convert the data stream into a suitable video signal, and output the video signal to display 106. In a corrections environment, VRS client 105 can be located at the facility where user 104 is incarcerated to that user 104 can communicate with persons who are not located at the facility, such as family, an attorney, or clergy. VRS client 105 can apply video watermarks to the VRS call. The video watermarks can include a visual indication that informs one or more parties to the call that the call is being recorded. The video watermarks can include a time and/or date indication. The video watermarks can include an identification associated with one or more of the parties to the call, such as an inmate identification number and/or an identification of the corrections facility.

Signaling over packet-switched network 130 is preferably implemented using session initiation protocol (SIP). Alternatively, signaling over packet-switched network 130 is implemented using the H.323 standard from the International Telecommunication Union Telecommunication Standardization Sector (ITU-T). Those skilled in the art will recognize that any signaling means suitable for transmitting and receiving video substantially in real-time is within the scope of the present invention.

In a preferred embodiment, display 106 can be a high definition flat panel display with digital inputs, such as digital visual interface (DVI) or high-definition multimedia interface (HDMI) connectors. VRS client 105 can include digital outputs, such as digital visual interface (DVI) or high-definition multimedia interface (HDMI) connectors. VRS client 105 can connect to display 106 via compatible cabling, as is known in the art. User 104 can operate VRS client 105 by a remote input device, such as an infrared (IR), radio frequency (RF), or Bluetooth® handheld remote. VRS client 105 can include a digital video camera assembly mounted to the front-facing (i.e., user-facing) panel. The digital video camera can include an active pixel sensor, such as a complementary metal oxide semiconductor (CMOS) sensor or a charged coupled device (CCD) sensor. VRS client 105 can include a network interface for establishing network link 132 with packet-switched network 130, such as Ethernet support and a wired an RJ-45 connector and/or IEEE 802.11 "Wi-Fi" connectivity. VRS client 105 can include one or more universal serial bus (USB) connectors for connecting USB devices, such as flash accessory that can be used to alert a D-HOH user that an incoming call is waiting to be answered. VRS client 105 can also include an interface for flash storage media, such as a Secure Digital (SD) non-volatile memory card. VRS client 105 can include a clamp that can be used to fasten VRS terminal 105 to display 106 in so that the camera faces user 104 as user 104 views display 106. The clamp can be opened to be alternatively used as a desktop stand.

While the foregoing describes a preferred embodiment of the present invention, one skilled in the art will appreciate that various changes, substitutions and alterations can be made without departing from the scope of the invention. For example, a single device having an integrated VRS client 105, 115 and display 106, 116 is within the scope of the present invention. Moreover, VRS client 105, 115 can be implemented as software executing on a general purpose computer meeting the hardware requirements for video telephony over IP networks and programmed with software to perform the functions of VRS client 105, 115 and display 106, 116 as disclosed herein is within the scope of the present invention. Such general purpose computers include desktop personal computers (PC), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

Returning to FIG. 1, VRS client 115 can be operated by the VRS service provider. Sign language interpreter 114 is located in such a way that interpreter 114 can interact with VRS client 115. While only one sign language interpreter 114 and one VRS client 115 is shown, one skilled in the art will understand that a VRS service provider may comprise a large enterprise including hundreds of sign language interpreters (or more) and sufficient service side equipment to provide around the clock VRS service to a large number of users.

Interpreter 114 is preferably a person who can communicate via sign language and is proficient at sign language translation. Display 116 can be any device suitable for displaying to interpreter 114 the video signal of a user 104 in sufficient quality so that interpreter 114 can comprehend the sign language from user 104. VRS client 115 can include a video capture device suitable for capturing a video signal of interpreter 114 within the field-of-view of the camera at sufficient quality and frame rate to support sign language communication with user 104. VRS client 115 can also include hardware and/or software to, substantially in real-time, convert the captured video signal into a data stream suitable for transmission over packet-switched network 130, such as an internet protocol (IP) network, over network link 134. VRS client 105 can also include hardware and/or software to transmit the data stream over packet-switched network 130 at sufficient network speed so that VRS client 105 can display the data stream as video on display device 106 in sufficient quality for user 104 to comprehend sign language in the displayed video. VRS client 115 can also include hardware and/or software to, substantially in real-time, receive a data stream from VRS client 105 from packet-switched network 130 over network link 134, convert the data stream into a suitable video signal, and output the video signal to display 116.

Service side equipment can also include traditional public switched telephone network equipment (PSTN), shown in FIG. 1 as telephone 118. While a simple telephone 118 is shown, one skilled in the art would understand that any type of equipment for making and receiving PSTN calls is within the scope of the present invention, including complex enterprise-level telephone systems, computers adapted for placing telephone calls, and cellular telephones. Telephone 118 is connected to the public switched telephone network (PSTN) 140 by network link 144 and is capable of making and receiving traditional circuit switched telephone calls to PSTN telephone numbers.

Hearing person 124 can be a person who has the ability to communicate over PSTN 140 using at least one spoken language via telephone 128. Telephone 128 is connected to the public switched telephone network (PSTN) 140 by network link 142 and is capable of making and receiving traditional circuit switched telephone calls to PSTN telephone numbers. While a simple telephone 128 is shown, one skilled in the art would understand that any type of equipment for making and receiving PSTN calls is within the scope of the present invention, including complex enterprise-level telephone systems, computers adapted for placing telephone calls, and cellular telephones.

Rules gateway 135 is connected to packet-switched network 130 over network link 136. Rules gateway 135 can be located in the corrections environment where user 104 is located. Rules gateway 135 can be included in service side equipment located at a facility operated by the VRS service provider. Rules gateway 135 can be implemented as a software-as-a-service (SaaS) web service hosted in cloud networking system and accessible by way of packet-switched network 130. Rules gateway 135 can be used to determine whether a VRS call in a corrections environment is to be recorded. Rules gateway 135 can be used to modify VRS call properties for recording. The operation of rules gateway 135 is explained in further detail with respect to FIG. 2.

Recorder 137 is a device that is capable of recording a VRS call, including audio, video, and any watermarks applied to the call. Recorder 137 can be connected to packet-switched network 130 over network link 138. Recorder 137 can be located in the corrections environment where user 104 is located. Recorder 137 can be included in service side equipment located at a facility operated by the VRS service provider. Recorder 137 can be implemented as a software-as-a-service (SaaS) web service hosted in cloud networking system and accessible by way of packet-switched network 130. Recorder 137 can be programmed to automatically record a VRS call based on call properties associated with the VRS call. The call properties can be modified by the VRS client 105 in response to an instruction from rules gateway 135. The operation of recorder 137 is explained in further detail with respect to FIG. 2.

Rules gateway 135, recorder 137, VRS client 105, and VRS client 115 can be implemented as separate and distinct systems that operate independent of location and communicate with each other by way of the Internet. Alternatively, one or more of rules gateway 135, recorder 137, VRS client 105, and VRS client 115 can be combined to suit a particular application. For example, VRS client 105, rules gateway 135, and recorder 137 can be integrated into one device for installation at a corrections facility that maintains its own recordings on-site. More than one device can also be provided for redundancy. For example, a recorder can be installed at a corrections facility and a recorder can be installed at the service provider, each recorder separately recording the VRS call in case one recorder fails.

User 104 initiates a VRS video call with Interpreter 114. Interpreter 114 then uses telephone 118 to call hearing person 124 on behalf of user 104. The call to hearing person 124 may be placed automatically by service side equipment. Interpreter 114 and user 104 communicate using sign language via VRS client 105 and VRS client 115. Interpreter 114 and hearing person 124 communicate using spoken language via telephone 118 and telephone 128. In this way, interpreter 114 acts as an intermediary between user 104 and hearing person 124, interpreting the communication between user 104 and hearing person 124.

Figure 2:
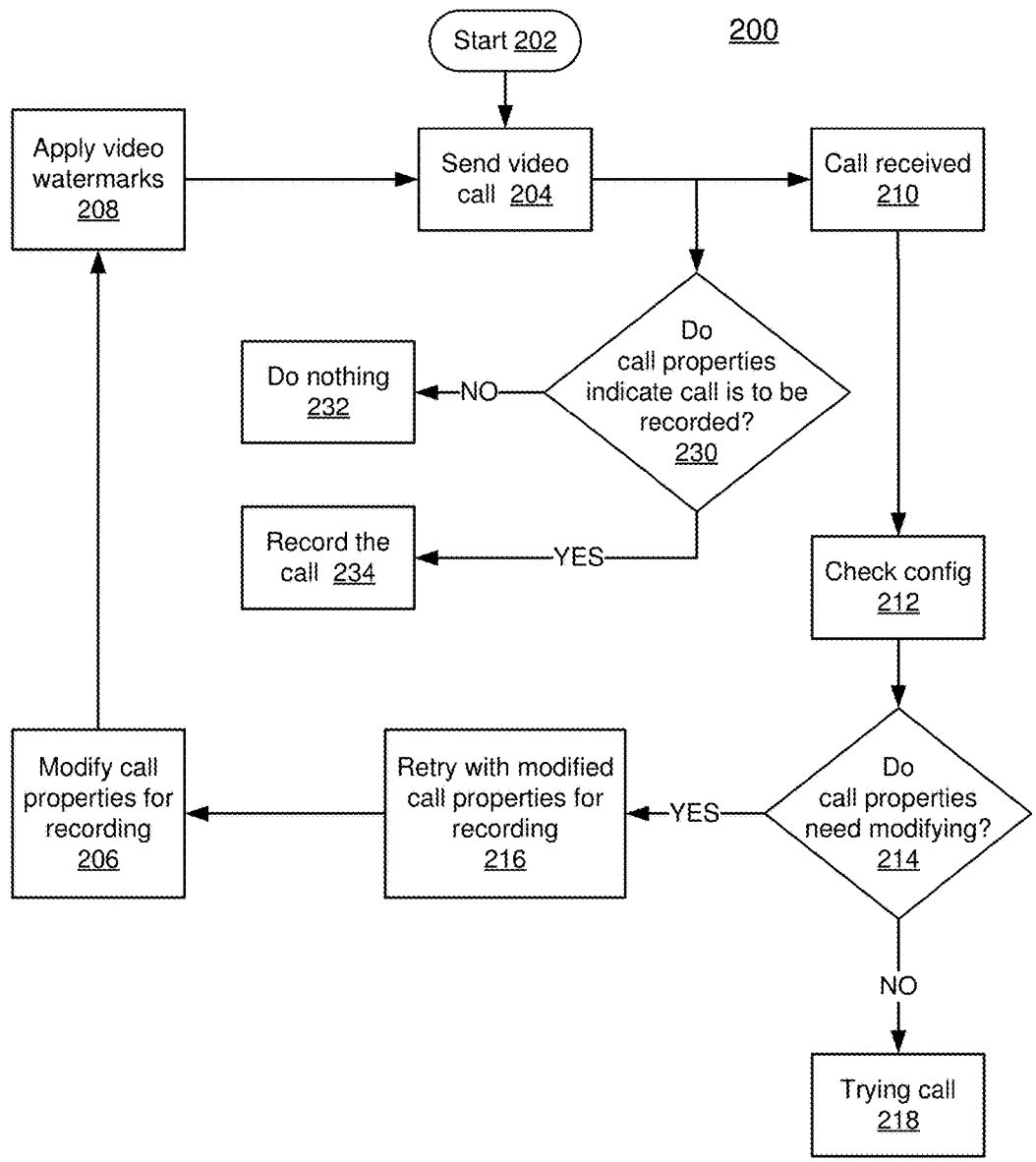
FIG. 2 is a flowchart showing a method for recording a video relay service call according to an embodiment of the present invention.

FIG. 2 is a flowchart showing a method for recording a video relay service call according to an embodiment of the present invention. Steps 204, 206, and 208 are performed by video client 105. Steps 210, 212, 214, 216, and 218 are performed by rules gateway 135. Steps 230, 232, and 234 are performed by recorder 137. The method starts at 202 and proceeds to step 204.

At step 204, video client 105 initiates a VRS call, for example by means of session initiation protocol (SIP), and sends the VRS call to rules gateway 135 on a default IP port, for example port 1. Rules gateway 135 receives the call at step 210. At step 212, rules gateway 135 checks in a database whether the received call is a call that should be recorded. The database includes preconfigured tables that are preconfigured by a security administrator to indicate which calls are to be recorded for a particular inmate. For example, the database can indicate, for a particular inmate ID, phone numbers for which a call must not be recorded. From that information it can be inferred that calls for the particular inmate ID from all other numbers should be recorded. In another example, the database can indicate a call source and call destination pair for which a call must be recorded. Alternatively, the database can indicate a call source and call destination pair for which a call must not be recorded. For example, the database may indicate that a call from inmate 12345 to phone number 555-1212 must not be recorded because the call is between an inmate and his attorney and is a privileged communication.

At step 214, rules gateway 135 determines whether the call properties need modifying. If the database indicates that the call should be recorded, then rules gateway 135 checks the call properties to see whether the call properties indicate that the call will be recorded. If the call properties do not indicate that the call will be recorded, then rules gateway 135 determines that the call properties need modification and the method proceeds to step 216. For example, if the call came in on the default port (port 1 in this example), but the call is a call that should be recorded, the call needs to be changed to a port that recorder 137 uses to record VRS calls (port 2 in this example) and send back to recorder 137. If the call properties indicate that the call will be recorded (i.e., the call comes in on port 2 in this example), then rules gateway 135 determines that the call properties do not need modification and the method proceeds to step 218. Similarly, if the database indicates that the call should not be recorded, then rules gateway 135 allows the call to pass to step 218. In this example, the call remains on port 1 and is not sent back to recorder 137.

At step 216, rules gateway 135 retries the call with call properties modified for recording. That is, rules gateway 135 sends instructions to video client 105 to retry the call with call properties indicating that the call is to be recorded. For example, rules gateway 135 sends instructions to video client 105 to retry the call on the IP port recorder 137 port 2.

At step 206, video client 105 modifies the call properties according to the instructions from rules gateway 135 so that the call will be recorded. For example, video client 105 retries the call on a port that recorder 137 uses to record VRS calls (port 2 in this example). Video watermarks can then be applied to the call.

At step 208, video client applies video watermarks to the call. The video watermark provides a visual indication to the parties on the call that the call is being recorded. The visual indication can be overlaid on the video portion of the VRS call so that a person watching the video portion of the VRS call can see the visual indication as the video portion of the VRS is being displayed to the person. In addition to notice that the call is being recorded, the video watermark can include other visual indications such as date, time, phone number called, phone number received, and an inmate ID. Watermarking can also include applying an audio announcement at the beginning of the call that the call is being recorded and/or that the call is to/from a corrections facility. The method proceeds to step 204 with the modified call properties. In this example, the modified call properties include the call port being changed to a port that recorder 137 uses to record VRS calls (port 2 in this example) and watermarking being enabled.

At step 204, video client 105 sends the video call to rules gateway 135 and recorder 137 with the modified call properties. In this example, the modified call properties include the call port being changed to a port that recorder 137 uses to record VRS calls (port 2 in this example) and watermarking being enabled. The method proceeds to steps 210 and 230.

At step 230, recorder 137 determines whether the call properties indicate that the call is to be recorded. Because the call properties were modified at step 206 to indicate that the call is to be recorded, the method proceeds to step 234 and the call is recorded. In this example, because the call is received by recorder 137 on a port that recorder 137 uses to record VRS calls (port 2 in this example), recorder 137 records the call.

At step 210, rules gateway 135 receives the call with the call properties modified in step 206 the watermarks applied in step 208. In this example, rules gateway 135 receives the call on port 2 indicating that the call will be recorded by recorder 137. At step 212, rules gateway 135 checks the configuration to determine whether the call should be recorded. In this example, the call properties were modified in step 206 to change the call to a port that recorder 137 uses to record VRS calls (port 2 in this example).

At step 214, rules gateway 135 determines whether the call properties need modifying. Because the call properties were modified in step 206 to change the call to a port that recorder 137 uses to record VRS calls (port 2 in this example), rules gateway 135 checks in a database whether the received call is a call that should be recorded. Because it was determined in the previous iteration of step 214 that the call is to be recorded, rules gateway 135 again determines that the call is to be recorded. Then rules gateway 135 checks the call properties to see whether the call properties indicate that the call will be recorded. In this example, the call properties were modified in step 206 to change the call to a port that recorder 137 uses to record VRS calls (port 2 in this example), so rules gateway 135 determines that the is to be recorded and that the call properties indicate that the call will be recorded. The process proceeds to step 218, where rules gateway 135 tries to complete the VRS call with recording and watermarking enabled.

In a preferred embodiment, steps 204, 206, and 208 are performed by video client 105. Steps 210, 212, 214, 216, 218, and 220 are performed by rules gateway 135. Steps 230, 232, and 234 are performed by recorder 137. Dividing the steps in this manner enables video client 105, rules gateway 135, and recorder 137 to be implemented as separate and distinct network devices and/or logical devices that can operate with each other from different geographic locations, including as a SaaS cloud based web-service. Dividing the steps in this manner also enables video client 105, rules gateway 135, and recorder 137 to be implemented as separate and distinct network devices and/or logical devices that can be duplicated to provide redundancy and enhanced reliability.

For example, video client 105 and rules gateway 135 can be installed at a corrections facility where an incarcerated deaf or hearing-impaired inmate uses video client 105 to communicate with people outside the corrections facility and a security administrator within the corrections facility uses and maintains the databases of rules gateway 135 with the information related to the recording of calls. Recorder 137 can be located at a VRS service provider location and offered to the corrections facility as a service. In this example, video client 105 and rules gateway 135 can be embodied as software residing and executing on one or more networked computers at the corrections facility.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method for recording video relay service (VRS) calls, the method comprising:
providing a VRS call recorder;
providing a VRS rules gateway connected to the VRS call recorder;
providing a VRS video client connected to the VRS call recorder and the VRS rules gateway;
initiating a VRS call using the VRS video client, the VRS call including at least one sign language interpreter;
sending the VRS call to the VRS rules gateway;
determining, by the VRS rules gateway, whether the VRS call is to be recorded;
in response to a determination that the VRS call is not to be recorded, trying the VRS call without recording the VRS call;
in response to a determination that the VRS call is to be recorded:
modifying a property of the VRS call to indicate that the call is to be recorded, in which modifying a property of the VRS call to indicate that the call is to be recorded further comprises changing an internet protocol (IP) port of the VRS call from an IP port that the VRS call recorder recognizes as a default IP port or an IP port indicative of a call that is not to be recorded to an IP port that the VRS call recorder recognizes as an IP port indicative of a call that is to be recorded;
detecting, by the VRS call recorder, the modified VRS call property; and
in response to detecting the modified VRS call property, trying the VRS call with recording enabled.

2. The method of claim 1, in which one or more of the VRS video client, VRS rules gateway, and VRS recorder are installed at a corrections facility in which inmates are incarcerated.

3. The method of claim 1, in which a user of the VRS video client is an inmate incarcerated at a corrections facility.

4. The method of claim 3, in which a user of the VRS video client is hearing impaired or communicates by means of sign language.

5. The method of claim 3, in which the VRS call is not recorded if the VRS call is a privileged communication between the inmate and another party to the VRS call.

6. The method of claim 1, in which the response to detecting the modified VRS call property further comprises automatically recording the VRS call by the VRS call recorder.

7. The method of claim 1, in which the VRS call is initiated using session initiation protocol (SIP).

8. The method of claim 1, in which determining whether the VRS call is to be recorded is based on the combination of a call source and a call destination of the VRS call.

9. The method of claim 8, in which a plurality of call source and call destination combinations is defined in a preconfigured table of the VRS rules gateway.

10. The method of claim 1, in which the response to detecting the modified VRS call property includes applying a video watermark to the VRS call.

11. The method of claim 10, in which the video watermark comprises a visual indication that the VRS call is being recorded.

12. The method of claim 10, in which the video watermark comprises one or more visual indications selected form a group consisting of: a date, a time, a phone number called, a phone number received, and an inmate ID.

13. A system for recording video relay service (VRS) calls, the system comprising:
a VRS call recorder;
a VRS rules gateway connected to the VRS call recorder;
a VRS video client connected to the VRS call recorder and the VRS rules gateway;
in which the system is configured for:
the VRS video client initiating a VRS call, the VRS call including at least one sign language interpreter;
the VRS video client sending the VRS call to the VRS rules gateway;
the VRS rules gateway determining whether the VRS call is to be recorded;
in response to a determination that the VRS call is not to be recorded, the VRS rules gateway trying the VRS call without recording the VRS call;
in response to a determination that the VRS call is to be recorded:
the VRS rules gateway sending an instruction to the VRS video client, the instruction modifying a property of the VRS call to indicate that the call is to be recorded, in which modifying a property of the VRS call to indicate that the call is to be recorded further comprises changing an internet protocol (IP) port of the VRS call from and IP port that the VRS call recorder recognizes as a default IP port or an IP port indicative of a call that is not to be recorded to an IP port that the VRS call recorder recognizes as an IP port indicative of a call that is to be recorded;
the VRS video client modifying the property of the VRS call to indicate that the call is to be recorded and re-initiating the VRS call;
the VRS call recorder detecting the modified VRS call property; and
in response to detecting the modified VRS call property, the VRS rules gateway trying the VRS call with recording enabled.

14. The system of claim 13, in which one or more of the VRS video client, VRS rules gateway, and VRS recorder are installed at a corrections facility in which inmates are incarcerated.

15. The system of claim 13, in which a user of the VRS video client is an inmate incarcerated at a corrections facility.

16. The system of claim 15, in which a user of the VRS video client is hearing impaired or communicates by means of sign language.

17. The system of claim 15, in which the VRS call recorder does not record the VRS call if the VRS call is a privileged communication between the inmate and another party to the VRS call.

18. The system of claim 13, in which the response to detecting the modified VRS call property further comprises automatically recording the VRS call by the VRS call recorder.

19. The system of claim 13, in which the VRS video client initiates the VRS call using session initiation protocol (SIP).

20. The system of claim 13, in which the VRS rules gateway determines whether the VRS call is to be recorded based on the combination of a call source and a call destination of the VRS call.

21. The system of claim 20, in which a plurality of call source and call destination combinations is defined in a preconfigured table of the VRS rules gateway.

22. The system of claim 13, in which the response to detecting the modified VRS call property includes applying a video watermark to the VRS call.

23. The system of claim 22, in which the video watermark comprises a visual indication that the VRS call is being recorded.

24. The system of claim 22, in which the video watermark comprises one or more visual indications selected form a group consisting of: a date, a time, a phone number called, a phone number received, and an inmate ID.

* * * * *